United States Patent Office 3,772,300
Patented Nov. 13, 1973

3,772,300
2,2 - DISUBSTITUTED OMEGA-(1,4-DIAZABICYCLO [4.4.0]-DECANE)ALKANAMIDES AND RELATED COMPOUNDS
Calvin H. Lovell, Morton Grove, Ill., assignor to G. D. Searle & Co., Chicago, Ill.
No Drawing. Filed May 28, 1971, Ser. No. 148,211
Int. Cl. C07d 51/70
U.S. Cl. 260—268 BC         4 Claims

ABSTRACT OF THE DISCLOSURE 2,2-disubstituted alkanamides having a diazabicyclodecane or diazabicyclononane substituent at the ω-position are described herein. The compounds are useful as anti-arrhythmic agents. The compounds are prepared by starting with the appropriate disubstituted acetonitrile or acetamide or from the appropriate diazabicycloalkane.

---

The present invention relates to a group of compounds which are 2,2-disubstituted aminoalkanamides. More particularly, the present invention relates to a group of compounds having the following general formula

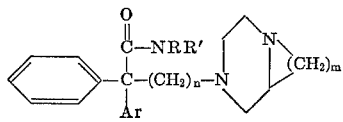

wherein Ar is selected from the group consisting of phenyl, halophenyl, tolyl, and pyridyl; —NRR' is selected from the group consisting of amino and di(lower alkyl) amino; $m$ is 3 or 4; and $n$ is 2 or 3.

The lower alkyl radicals referred to above contain up to 6 carbon atoms and can be illustrated by methyl, ethyl, propyl, and butyl. The halophenyl radicals referred to above include fluorophenyl, chlorophenyl, bromophenyl, and iodophenyl.

The organic bases of this invention from pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are useful because of their pharmacological properties. More particularly, the present compounds possess anti-arrhythmic activity and are similar to quinidine in this regard. Thus, they bring about a return to normal heart rhythm in animals in which the heart rhythm has become irregular.

The anti-arrhythmic activity of the present compounds has been demonstrated in the following way. Ventricular arrhythmia is induced by a 2-stage ligation of the anterior descending branch of the left coronary artery in each of 2 dogs. Quantities of test compound (5 mg./kg.) are administered intravenously at intervals to a possible maximum accumulated dose of 15 mg./kg. A compound is rated active if it produces at least a 25% reduction in ectopic beats for a period of at least 10 minutes in half or more of the dogs tested. When 2,2-diphenyl-4-(1,4-diazabicyclo[4.4.0]dec-4-yl)butyramide and 2-phenyl-2-(2-pyridyl)-4-(1,4 - diazabicyclo[4.4.0]dec-4 - yl)butyramide were tested in this way, each was found to be active as an anti-arrhythmic agent.

Several methods are used to prepare the compounds of the present invention. Where —NRR' is —NH₂, the compounds are usually prepared by the hydrolysis of the appropriate nitrile with concentrated sulfuric acid. Two procedures are available for the preparation of the intermediate nitriles. Thus, a disubstituted acetonitrile of the formula

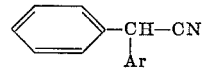

wherein Ar is defined as above is reacted with a strong base such as sodium hydride or sodamide to give the corresponding salt. This salt is then reacted with an appropriate haloalkyl amine of the formula

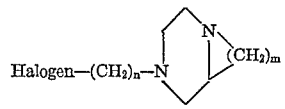

wherein $m$ and $n$ are defined as above and halogen is preferably chlorine. The reaction is carried out in an inert solvent such as toluene or dimethyl sulfoxide with heating. This procedure, described here for the preparation of intermediate nitriles, can also be used for the preparation of those final products wherein R and R' are lower alkyl.

In an alternate procedure for the preparation of the intermediate nitriles, a haloalkanonitrile of the formula

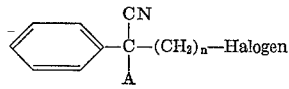

wherein Ar and $n$ are defined as above and halogen is preferably chlorine or bromine, is reacted with the appropriate 1,4-diazabicyclo[4.4.0]alkane. The reaction is carried out, with heating, in an inert solvent such as 2-butanone or dimethyl sulfoxide and in the optional presence of a salt such as sodium iodide and potassium carbonate.

The following examples are presented to further illustrate the present invention; they should not be construed as limiting it in spirit or in scope. In these examples, quantities are indicated in parts by weight and temperatures are indicated in degrees centigrade (° C.).

EXAMPLE 1

Hydrogen chloride gas is bubbled into a solution of 18.4 parts of 4-(2-hydroxyethyl)-1,4-diazabicyclo[4.4.0] decane in 225 parts of chloroform with stirring while the temperature is maintained at about 40–50° C. A precipitate forms immediately and introduction of the gas is continued until the pH of the solution is 1–2. The mixture is heated to reflux and thionyl chloride is added portionwise. The mixture first becomes clear and then a new precipitate forms. Refluxing is continued for a total of 6 hours before the mixture is allowed to stand at room temperature for 16 hours. The chloroform solvent is removed under reduced pressure and then benzene is added and evaporated under reduced pressure. Finally, ether is added to the solid residue to aid in filtration. The separated solid is then recrystallized from absolute ethanol to give 4-(2 - chloroethyl) - 1,4 - diazabicyclo[4.4.0]decane dihydrochloride melting at about 242–245° C.

A solution is prepared from 21 parts of 4-(2-chloroethyl)-1,4-diazabicyclo[4.4.0]decane dihydrochloride and 80 parts of water. The resulting solution is chilled and 12 parts of sodium hydroxide is added portionwise. The mixture is then saturated with potassium carbonate and extracted with toluene. The toluene extract is washed with saturated aqueous sodium chloride solution and then dried over potassium carbonate. The solution is then concentrated to a volume of about 75 parts.

A solution is prepared from 14.8 parts of α-phenyl-2-pyridineacetonitrile and 200 parts of toluene. About 65 parts of toluene is distilled to dry the apparatus and then 3.3 parts of sodium amide is added slowly as a solid over a period of 30 to 45 minutes. The mixture is then heated at 90–95° C. for 30 minutes before the toluene solution of 4-(2-chloroethyl)-1,4 - diazabicyclo[4.4.0]decane obtained in the preceding paragraph is added over a period of 40 minutes. The mixture is then heated at 90–100° C. for 4 hours before it is allowed to stand at room temperature for 16 hours. Water is added to the resulting mixture and the toluene solution is separated and extracted with 3 portions of 1 N acetic acid. The acid extracts are combined, washed with benzene and made alkaline by the addition of sodium hydroxide. The resulting mixture is extracted with ether and the ether solution is dried over potassium carbonate, concentrated, and distilled to give 2-phenyl-2-(2-pyridyl)-4-(1,4 - diazabicyclo[4.4.0]dec-4-yl)butyronitrile distilling at about 200–220° C. at 0.5 mm. pressure. This product is dissolved in ethanol and mixed with an ethanol solution of maleic acid. The precipitate which forms is separated by filtration and recrystallized from ethanol to give 2-phenyl-2-(2-pyridyl)-4-(1,4-diazabicyclo[4.4.0]dec-4 - yl)butyronitrile dimaleate melting at about 157–160° C.

To a solution of 16.5 parts of 2-phenyl-2-(2-pyridyl)-4-(1,4-diazabicyclo[4.4.0]dec-4-yl)butyronitrile dimaleate in 300 parts of warm water is added 50% aqueous sodium hydroxide solution to make the mixture alkaline. An oil separates and then solidifies. It is extracted into ether and the ether solution is washed with water and dried over potassium carbonate. The ether solvent is then removed to leave the residual free base. This base is added to 55 parts of concentrated sulfuric acid. The mixture is heated and stirred on a steam bath for 2 hours and solution takes place. The solution is then poured into a mixture of ice and 90 parts of concentrated ammonium hydroxide. The resulting mixture is allowed to stand for 2 hours before it is extracted with a mixture of ether and chloroform. The resulting organic extract is separated and dried and then finally concentrated to leave a residual oil. The oil is triturated with a mixture of pentane and hexane to give 2-phenyl-2-(2-pyridyl)-4-(1,4 - diazabicyclo[4.4.0]dec - 4-yl)butyramide melting at about 170–176° C. This material is dissolved in 2-propanol and mixed with a 2-propanol solution of maleic acid. The precipitate which forms is separated by filtration to give 2-phenyl-2-(2-pyridyl)-4-(1,4-diazabicyclo[4.4.0]dec-4 - yl)butyramide dimaleate melting at about 173–175° C. The free base has the following formula

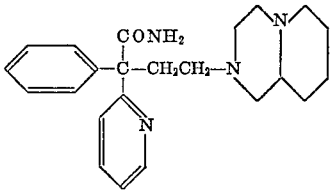

EXAMPLE 2

To a solution of 56 parts of 1,4-diazabicyclo[4.4.0]decane in 220 parts of distilled dimethyl sulfoxide there is added 60 parts of 4-bromo-2,2-diphenylbutyronitrile and the resulting solution is heated at 90° C. for 16 hours. The solution is then allowed to cool before it is poured into 2000 parts of water and 100 parts of 50% aqueous sodium hydroxide solution is added. The mixture is extracted with benzene and the combined benzene solutions are extracted with 2 N hydrochloric acid. The acid extracts are combined and made alkaline and then extracted with ether. The ether extracts are filtered to remove some tar and then dried over potassium carbonate and finally concentrated. The residue is distilled to give 2,2-diphenyl-4-(1,4-diazabicyclo[4.4.0]dec-4-yl)butyronitrile boiling at about 200–220° C. at 0.5 mm. pressure. This material is dissolved in 2-propanol and mixed with a solution of maleic acid in 2-propanol. The precipitate which forms is separated by filtration and recrystallized from absolute ethanol to give 2,2-diphenyl-4 - (1,4 - diazabicyclo[4.4.0] dec-4-yl)butyronitrile dimaleate melting at about 176–180° C.

To 36 parts of 2,2-diphenyl-4-(1,4-diazabicyclo[4.4.0]dec-4-yl)butyronitrile there is added 220 parts of concentrated sulfuric acid while the temperature is maintained below 60° C. The mixture is stirred and heated on a steam bath for 1 hour and solution takes place. It is then poured into a mixture of ice and concentrated ammonium hydroxide. The precipitate which forms is separated by filtration and dissolved in chloroform and the chloroform solvent is evaporated to leave 2,2-diphenyl-4-(1,4-diazabicyclo[4.4.0]dec-4-yl)-butyramide. This compound melts at about 217–221° C. To a solution of 1.1 parts of this free base in 16 parts of hot absolute ethanol there is added 0.7 part of maleic acid in 5 parts of absolute ethanol. Upon cooling the solution, a precipitate forms. This is separated by filtration and dried to give 2,2-diphenyl-4-(1,4-diazabicyclo[4.4.0]dec-4-yl)butyramide dimaleate melting at about 195–198° C. The free base has the following formula

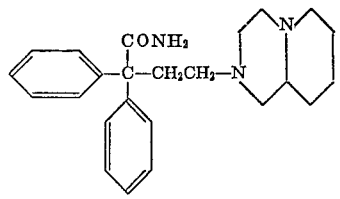

EXAMPLE 3

A solution of 27 parts of 5-chloro-2,2-diphenylvaleronitrile and 15 parts of sodium iodide in 200 parts of 2-butanone is heated to reflux for 30 minutes. A precipitate of sodium chloride forms and the solution is allowed to cool and 14 parts of potassium carbonate is added. To the resulting mixture is added a solution of 14 parts of 1,4-diazabicyclo[4.4.0]decane in a small amount of 2-butanone and the mixture is stirred at room temperature for 16 hours. It is then heated at reflux for 5 hours before it is filtered and the filtrate is concentrated. The resulting residue is dissolved in ether, washed with water, and then extracted twice with 1 N hydrochloric acid. The combined acid extracts are made alkaline with sodium hydroxide and then extracted into ether. The combined ether extracts are dried and concentrated to leave 2,2-diphenyl-5-(1,4-diazabicyclo[4.4.0]dec-4-yl)valeronitrile as an oil. This oil is reacted with hydrogen chloride to give 2,2-diphenyl-5-(1,4-diazabicyclo[4.4.0]dec-4-yl)valeronitrile dihydrochloride melting at about 233–238° C. with decomposition after recrystallization from absolute ethanol.

To 13 parts of 2,2-diphenyl-5-(1-,4-diazabicyclo[4.4.0]dec-4-yl)valeronitrile is added 90 parts of concentrated sulfuric acid. The mixture is heated on a steam bath for 2 hours with swirling. A solution is finally obtained and this is poured into ice water and the solution is made alkaline by the addition of 50% aqueous sodium hydroxide solution. The mixture is extracted with a mixture of chloroform and ether and the combined extracts are dried over potassium carbonate and concentrated to leave a residual oil. The oil is dissolved in 2-propanol and mixed with a solution of maleic acid in 2-propanol. The precipitate which forms is separated by filtration and recrystallized twice from absolute ethanol to give 2,2-diphenyl-5-(1,4-diazabicyclo[4.4.0]dec - 4 - yl)valeramide dimaleate ethanolate melting at about 165–170° C.

EXAMPLE 4

A solution of 60 parts of 4-bromo-2,2-diphenylbutyronitrile and 50 parts of 1,4-diazabicyclo[4.3.0]nonane in 275 parts of dimethyl sulfoxide is heated to 100° C. An exothermic reaction ensues so that the mixture is cooled briefly with water to control the temperature. It is then heated to 100° C. again and maintained at that temperature for 16 hours. The mixture is then cooled to room temperature and poured into 800 parts of water. It is then made alkaline by the addition of 50% aqueous sodium hydroxide solution. The resulting alkaline mixture is extracted with ether and the ether extracts are washed with water and extracted with 500 parts of 1 N acetic acid and 500 parts of 1 N hydrochloric acid. Each of the acid extracts is made alkaline and extracted with ether. The ether extracts are combined and distilled to give 2,2-diphenyl-4-(1,4-diazabicyclo[4.3.0]non-4-yl)butyronitrile boiling at about 190–210° C. at 0.1 mm. pressure.

To 25 parts of the nitrile obtained in the preceding paragraph there is added 275 parts of concentrated sulfuric acid. The resulting mixture is heated on a steam bath with swirling to bring about solution. After heating for 1.5 hours, the solution is poured into ice water and allowed to stand for 1 hour. It is then made alkaline by the addition of 50% aqueous sodium hydroxide solution. The resulting mixture is extracted with benzene, ether and chloroform and the combined extracts are dried over potassium carbonate and concentrated to leave a residual solid. The solid is recrystallized from absolute ethanol to give 2,2-diphenyl-4-(1,4-diazabicyclo[4.3.0]non - 4 - yl)butyramide melting at about 172–176° C.

EXAMPLE 5

To a solution of 30 parts of diethylamine in 175 parts of toluene is added 23 parts of diphenylacetyl chloride. A precipitate forms immediately but the mixture is refluxed for 3 hours with stirring. It is then allowed to stand for 16 hours and the solid is removed by filtration. The resulting filtrate is concentrated under reduced pressure and the resulting residue is dissolved in ether. The ether solution is washed with water and dried over potassium carbonate and the solvent is evaporated to leave a residual oil which then solidifies. The solid is recrystallized from hexane to give N,N-diethyldiphenylacetamide melting at about 64–68° C.

To 2 parts of sodium hydride (60% in mineral oil) there is added with cooling and stirring 175 parts of dimethyl sulfoxide which had been previously distilled from calcium hydride under reduced pressure. The mixture is maintained under nitrogen and then it is slowly heated to 45° C. Then, 10 parts of N,N-diethyldiphenylacetamide in 45 parts of dimethyl sulfoxide is added over a period of 15 minutes. The mixture is heated at 50° C. for 20 minutes before a solution of 12 parts of 4-(2-chloroethyl)-1,4-diazabicyclo[4.4.0]decane in 55 parts of dimethyl sulfoxide is added over a period of 15 minutes. The mixture is then heated at about 45° C. for 3 hours and then allowed to stand at room temperature under nitrogen for 16 hours. To the resulting mixture is added 220 parts of water and the resulting mixture is extracted with ether. The combined ether extracts are extracted with 1 N hydrochloric acid and the combined acid extracts are made alkaline with 50% sodium hydroxide solution. The resulting mixture is extracted with ether and the ether extract is dried over potassium carbonate and concentrated under reduced pressure to leave a residual oil. The oil is dissolved in 2-propanol and mixed with a 2-propanol solution of maleic acid. The precipitate which forms is separated by filtration and recrystallized from absolute ethanol to give N,N-diethyl-2,2-diphenyl-4-(1,4 - diazabicyclo[4.4.0]dec-4-yl)butyramide dimaleate melting at about 125–128° C. The free base of this compound has the following formula

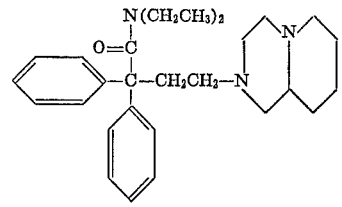

EXAMPLE 6

If the procedure of Example 2 is repeated using an equivalent quantity of 4-bromo - 2 - (4-tolyl)-2-phenylbutyronitrile in place of the 4-bromo-2,2-diphenylbutyronitrile, the product obtained is 2 - phenyl-2-(4-tolyl)-4-(1,4-diazabicyclo[4.4.0]dec-4-yl)butyramide.

Similarly, if the procedure of Example 1 is repeated using an equivalent quantity of α-(4-chlorophenyl)-phenylacetonitrile in place of the α-phenyl-2-pyridineacetonitrile, the product obtained is 2 - (4 - chlorophenyl)-2-phenyl-4-(1,4-diazabicyclo[4.4.0]dec-4-yl)butyramide.

What is claimed is:

1. A compound of the formula $$\underset{Ar}{\overset{\underset{\displaystyle\|}{O}}{\underset{\displaystyle C}{C}}}\underset{}{-NRR'}$$

(structure with phenyl, C(Ar)(CH₂)ₙ—N bicyclic ring with (CH₂)ₘ)

wherein Ar is selected from the group consisting of phenyl, chlorophenyl, tolyl, and pyridyl; —NRR' is selected from the group consisting of amino and di(lower alkyl) amino said lower alkyl groups having up to 6 carbon atoms; $m$ is 3 or 4; and $n$ is 2 or 3.

2. According to claim 1, the compound which is 2,2-diphenyl-4-(1,4-diazabicyclo[4.4.0]dec-4-yl)butyramide.

3. According to claim 1, the compound which is 2,2-diphenyl-4-(1,4-diazabicyclo[4.3.0]non-4-yl)butyramide.

4. According to claim 1, the compound which is 2-phenyl-2-(2-pyridyl) - 4 - (1,4-diazabicyclo[4.4.0]dec-4-yl)butyramide.

References Cited
UNITED STATES PATENTS

| | | | |
|---|---|---|---|
| 3,299,044 | 1/1967 | Cusic | 260—295.5 B |
| 3,388,128 | 6/1968 | Day | 260—268 BZ |
| 3,164,598 | 1/1965 | Freed | 260—268 BZ |

DONALD G. DAUS, Primary Examiner

U.S. Cl. X.R.

260—268 BZ, 268 R